(12) United States Patent
Pintiysky et al.

(10) Patent No.: US 9,116,621 B1
(45) Date of Patent: Aug. 25, 2015

(54) SYSTEM AND METHOD OF TRANSFER OF CONTROL BETWEEN MEMORY LOCATIONS

(71) Applicant: Kaspersky Lab ZAO, Moscow (RU)

(72) Inventors: Vladislav V. Pintiysky, Moscow (RU);
Dmitry A. Kirsanov, Moscow (RU);
Denis V. Anikin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/596,631

(22) Filed: Jan. 14, 2015

(30) Foreign Application Priority Data

Oct. 17, 2014 (RU) ................................ 2014141808

(51) Int. Cl.
*G06F 3/06* (2006.01)
*G06F 21/56* (2013.01)
*G06F 11/36* (2006.01)

(52) U.S. Cl.
CPC .............. *G06F 3/0607* (2013.01); *G06F 3/065* (2013.01); *G06F 3/067* (2013.01); *G06F 11/362* (2013.01); *G06F 11/3664* (2013.01); *G06F 21/566* (2013.01)

(58) Field of Classification Search
CPC .. G06F 11/362; G06F 11/3664; G06F 21/566
See application file for complete search history.

(56) References Cited

U.S. PATENT DOCUMENTS

| 7,363,463 | B2 | 4/2008 | Sheu et al. | |
| 7,930,590 | B2 * | 4/2011 | Cheng et al. | 714/25 |
| 7,945,761 | B2 | 5/2011 | Subrahmanyam et al. | |
| 8,239,832 | B2 * | 8/2012 | Stall et al. | 717/124 |
| 8,819,641 | B1 * | 8/2014 | Sweeney | 717/128 |
| 2003/0135791 | A1 * | 7/2003 | Natvig | 714/38 |
| 2006/0041866 | A1 * | 2/2006 | Sivaram | 717/124 |

* cited by examiner

*Primary Examiner* — Ryan Bertram
(74) *Attorney, Agent, or Firm* — Arent Fox LLP; Michael Fainberg

(57) ABSTRACT

Disclosed are system and method for controlling execution of a program. An example method includes determining a memory sector of interest in a first virtual memory location; duplicating the memory sector of interest in a second virtual memory location; tagging the memory sector of interest in the first virtual address space and the duplicated memory sector in the second virtual address space with different tags; selecting between the memory sector of interest and the duplicated memory sector a memory location for execution of the program; executing, by a hardware processor, the program in the selected memory location until receipt of a notification to transfer execution of the program from a memory sector tagged with one tag to a memory sector tagged with a different tag; and transferring program execution to the memory location other than the one in which the notification was received.

21 Claims, 8 Drawing Sheets

SYSTEM AND METHOD OF TRANSFER OF CONTROL BETWEEN MEMORY LOCATIONS

CROSS-REFERENCE TO RELATED APPLICATIONS

This application claims benefit of priority under 35 U.S.C. 119(a)-(d) to a Russian Application No. 2014141808 filed on Oct. 17, 2014, incorporated by reference herein.

TECHNICAL FIELD

The disclosure relates generally to the field of computing, and more specifically, to systems and methods of transferring of control between memory locations.

BACKGROUND

Current technologies for generation of API-function call logs during program execution require intervention in the contents of the address space of the processes or files on the hard drive disk, such as changing the code in system libraries of the operating system in memory and on disk. Such changes include the "introduction of a code" responsible for the mechanism of logging of API-function calls. The main steps of this mechanism may be as follows:
- interception of library management (for example, by intercepting API functions by changing the code of the destination function);
- transition during API call to the region of memory containing the handler code responsible for processing API functions and logging calls;
- execution of the code of the handler of the logging system;
- return of control over the library.

To capture the control over the logging system, there can also be used methods for changing the addresses of API function calls from the libraries in the import table of the executable file and/or placement of an "intermediate" library, to which the initial call is directed before transition to the originally called API-function from the original library.

One drawback of existing logging systems is that it is difficult to implement this logging system on different operating systems and their versions. For example, an update of an OS may cause the logging system to stops working and may require modifications to work with the updated OS. Another drawback is that presence of a logging system can be detected by malicious programs, regardless of their privileges, as virtually any "intrusion" into the address space of a process can be detected by malicious programs.

Accordingly, there is a need to improve mechanisms for logging of API function calls.

SUMMARY

Disclosed are example aspects of systems, methods and computer program products for controlling execution of a program by managing transfer of program execution between different virtual memory locations. One application of the disclosed aspects is the generation of a call log of API functions, which are called during the execution of a program. One technical result of the disclosed aspects includes tracking the execution by a processor of a program code embedded in a system memory by the alternating transfer of the execution of instructions from one virtual memory location to another virtual memory location and back.

An example method for controlling execution of a computer program includes: determining a memory sector of interest in a first virtual memory location; duplicating the memory sector of interest in a second virtual memory location; tagging the memory sector of interest in the first virtual address space and the duplicated memory sector in the second virtual address space with different tags; selecting between the memory sector of interest and the duplicated memory sector a memory location for execution of the program; executing, by a hardware processor, the program in the selected memory location until receipt of a notification to transfer execution of the program from a memory sector tagged with one tag to a memory sector tagged with a different tag; and transferring program execution to the memory location other than the one in which the notification was received.

In one example aspect, duplicating the memory sector of interest in a second virtual memory location includes: mapping the second virtual memory location onto the same physical memory pages as the first virtual memory location.

In one example aspect, tagging at least the memory sector of interest in the first virtual address space includes: assigning an attribute of nonexecutable to one or more logical pages of the memory sector of interest in the first virtual address space.

In one example aspect, tagging the duplicated memory sector in the second virtual address space includes: assigning an attribute of executable to one or more logical pages of the duplicated memory sector in the second virtual address space.

In one example aspect, the notification includes one of an interrupt and exception.

In one example aspect, the method further comprises saving in a log information about program instructions that transferred program control from a memory sector tagged with one tag to a memory sector tagged with a different tag.

In one example aspect, selecting a memory location further includes: selecting the memory sector of interest for execution of program instructions; and selecting the duplicate memory sector for execution of program API function libraries.

In one aspect, an example system for controlling execution of a computer program comprises: a hardware processor coupled to a memory, the processor being configured to: determine a memory sector of interest in a first virtual memory location; duplicate the memory sector of interest in a second virtual memory location; tag the memory sector of interest in the first virtual address space and the duplicated memory sector in the second virtual address space with different tags; select between the memory sector of interest and the duplicated memory sector a memory location for execution of the program; execute the program in the selected memory location until receipt of a notification to transfer execution of the program from a memory sector tagged with one tag to a memory sector tagged with a different tag; and transfer program execution to the memory location other than the one in which the notification was received.

In another aspect, an example computer program product, stored on a non-transitory computer-readable storage medium, comprises computer-executable instructions for controlling execution of a computer program, including instructions for: determining a memory sector of interest in a first virtual memory location; duplicating the memory sector of interest in a second virtual memory location; tagging the memory sector of interest in the first virtual address space and the duplicated memory sector in the second virtual address space with different tags; selecting between the memory sector of interest and the duplicated memory sector a memory location for execution of the program; executing, by a hardware processor, the program in the selected memory location until receipt of a notification to transfer execution of the program from a memory sector tagged with one tag to a memory sector tagged with a different tag; and transferring program execution to the memory location other than the one in which the notification was received.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for controlling execution of a program by managing transfer of program execution between different virtual memory locations. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
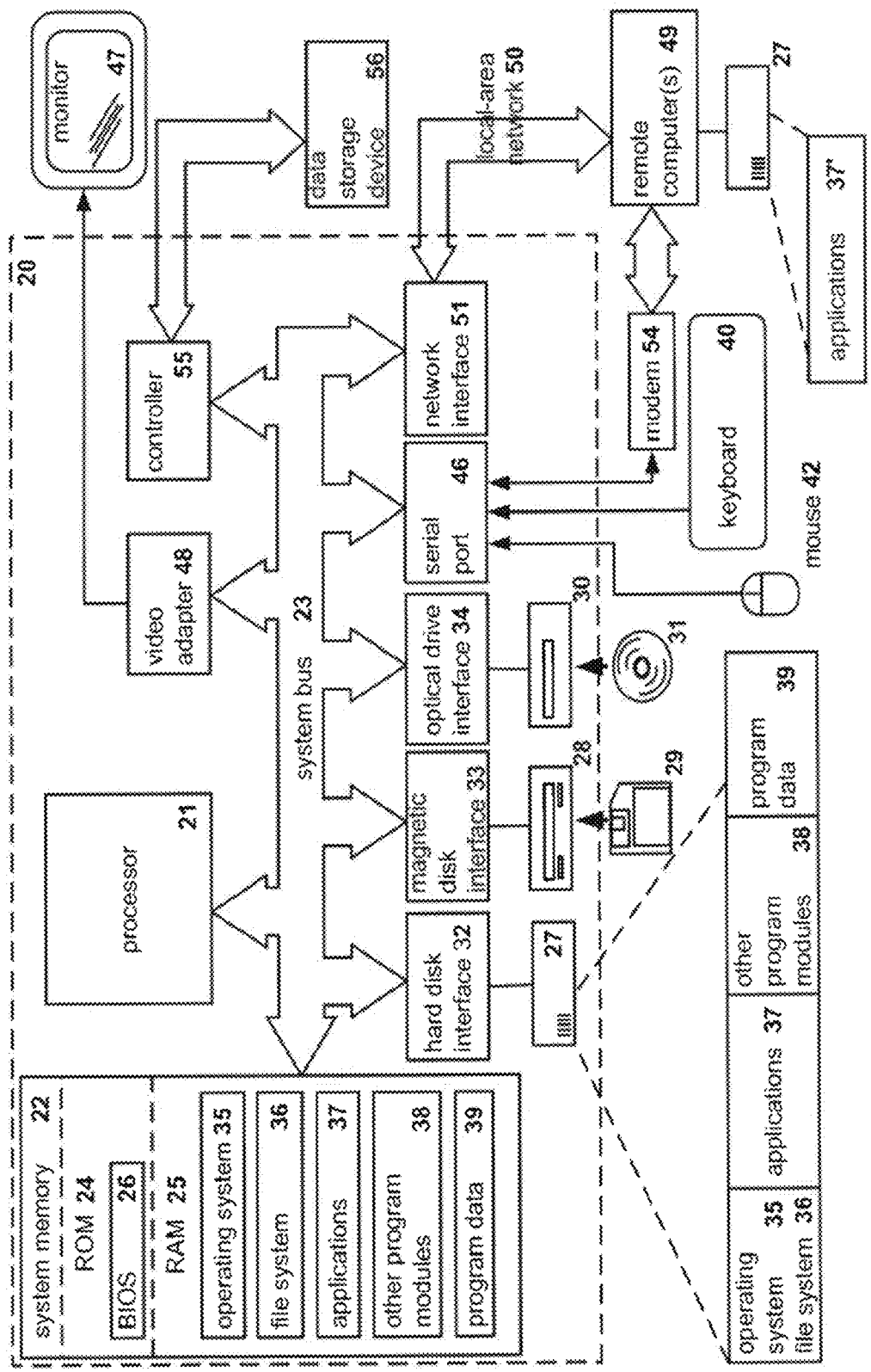
FIG. 1 shows an example of a general-purpose computer system, which may be used to implement the disclosed systems and methods for controlling program execution according to one aspect.

FIG. 1 shows an example of a general-purpose computer system (which may be a personal computer or a server) 20, which may be used to implement system and methods for controlling execution of a program. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

Figure 2:
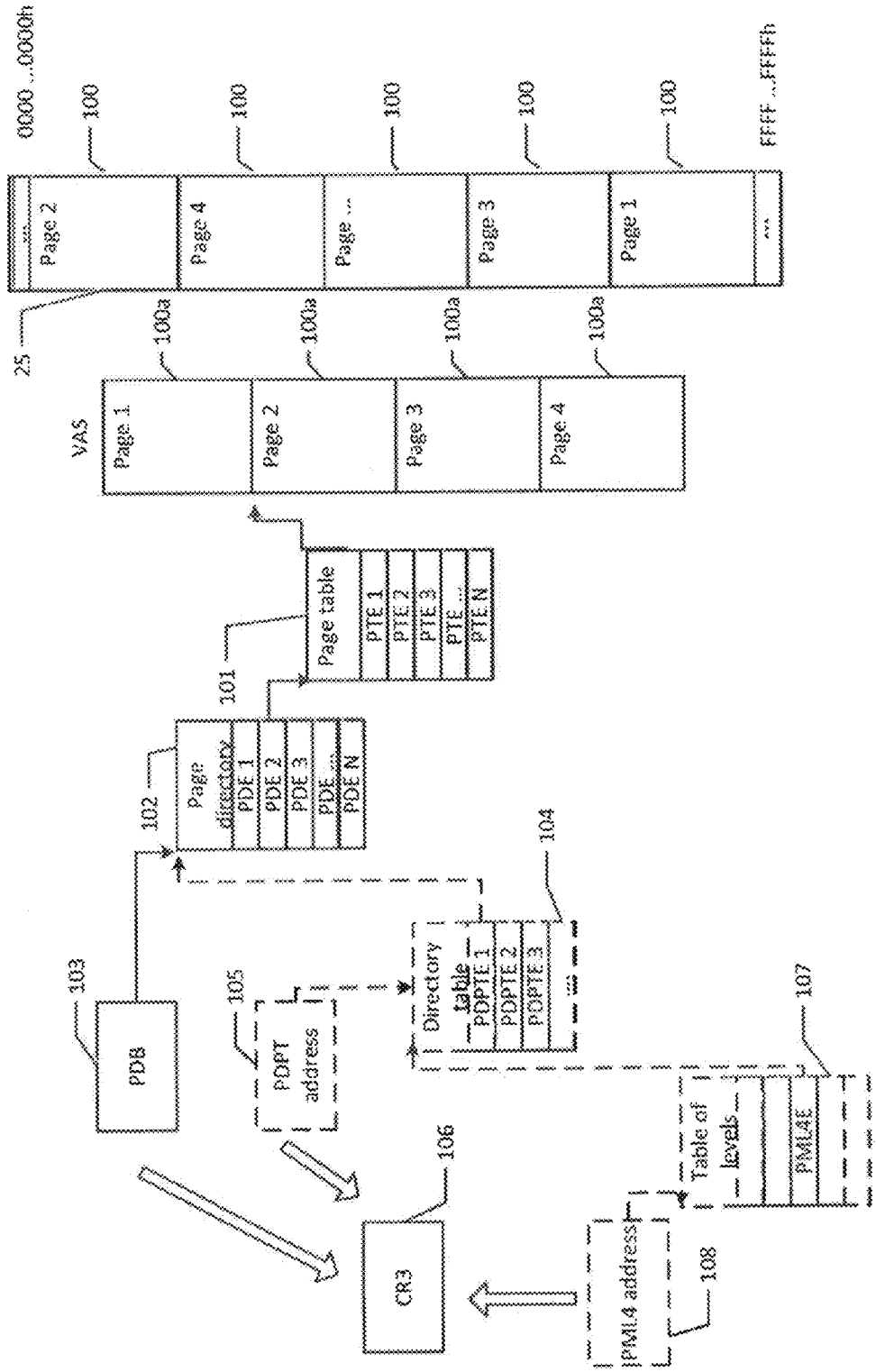
FIG. 2 shows a diagram of virtual memory system according to one aspect.

In one example aspect, a random access memory 25 is part of a system memory 22, which in the context of the present disclosure will also be called the physical memory; the entire physical memory is divided into physical pages 100, an example of which is given in FIG. 2. The set of addresses for addressing the physical memory form the physical address space. Since the size of the physical memory is limited, a virtual memory has been created for execution of programs, and the set of addresses for addressing the virtual memory forms a virtual address space. As used herein, the term virtual memory includes the totality of logical pages along with the structures which these pages describe (e.g., page directory pointer, page directory, page table). These structures shall be described below. As used herein, the term virtual address space and virtual memory are identical and used interchangeably.

The virtual address space may be divided into logical pages 100*a*. A logical page has its own virtual address, and can be mapped onto any physical address, as shown in FIG. 2. Thus, the logical pages correspond to physical pages or, in other words, the logical pages are mapped onto physical pages. In one example aspect, the logical pages are mapped onto the physical pages in arbitrary order, as shown in FIG. 2. In another example aspect, the logical pages are identically mapped onto the physical pages. Several logical pages can be mapped onto a single physical page.

The logical pages 100*a* are virtual objects (that is, not really existing, unlike the physical pages 100) and each such page has in a particular instance two addresses:
- a linear one— that by which it is disposed in the address space;
- a physical one— that onto which it is mapped in the physical memory 25 (in some cases this might not be present).

Virtual memory is technique of utilizing the system memory 22 on a local computer, and in a particular instance on a local computer and a remote computer. Due to the page organization of the memory, it is possible to realize the mechanism of virtual memory with control at the processor level. A logical page of memory can be swapped for example, onto a hard disk 24; with its contents having been from the physical memory 25, the size of the actually usable virtual memory substantially increases and is now limited by the size of the available hard disks; it is not necessary for the hard disks onto which the pages are swapped to be situated on a local computer.

FIG. 2 shows a virtual memory system in the case of the usual 32-bit page addressing (paging). To describe a page, use can be made of a data structure consisting of a physical address onto which the page is mapped and flags (attributes) defining the properties of this page. Information about the 32-bit address of the start of the page is located in the major 20 bits; these are also stored in the page description. The page descriptions are grouped into page tables 101. Page descriptors are 4-byte entries. The page tables are grouped into a page directory 102. A page directory 102 is a file of 4 kb size, consisting of 4-byte entries or PDE (Page Directory Entries). Each entry points to a page table 101 and almost coincides with the PTE in format. A PDE determines the location of a page table, pointing to the address of the physical page of memory, and also the attributes of the page table. In order for a processor to be able to use a page transformation, it needs to have the address of the page directory start 103 (Page Directory Base—PDB) indicated. This address is kept in the CR3 register.

Hence, for addressing in a 32-bit address space, in order to indicate the page number in the page table, a 10-bit value (since the table stores 1024 page descriptions) is needed. To indicate precisely which table in the page directory will be used, again a 10-bit value is needed. In order to indicate an offset within a page, a 12-bit value is needed. If the dimensions of these values are added, it turns out that it is necessary to specify a 32-bit data structure for access to the memory: 10 bits for the table number, another 10 for the page number in the table, and 12 for the offset within the page itself.

In the case when a PAE (Physical Address Extension) technique is used, an additional hierarchy level is added—the page directory table 104, which contains PDPTE (Page-Directory-Pointer-Table Entry). In this case, the CR3 register will contain the physical address 105 of an aligned page directory table 104.

In the case when the IA-32e technique is used, an additional hierarchy level is added to the page table, the page directory and the directory table: the table of page addressing levels 107, which contains PML4E (Page Map Level Entry). In this case, the CR3 register 106 will contain a structure indicating the physical address 108 of an aligned table of page addressing levels 107.

When launching a program, the operating system creates a process within which its flows will be carried out. The program file is loaded into a certain location of the physical memory of the computer. In the case of using a virtual memory, the file is loaded into a certain location of the virtual memory onto which the system maps a certain pool of physical addresses. The program then begins to be executed, that is, the processor executes the machine instructions in the sequence in which they are written in the program file. The process created by the operating system is basically a container of resources needed to run the program code. In a multitasking operating system, each process corresponds to its own virtual address space. It follows from the description of the mechanism of addressing a virtual address space that, in order to gain access to the virtual address space of a process, it is necessary to have access to the control register CR3 106. By controlling the structures and their elements, to which access is obtained on the basis of information contained in the control register CR3 106, the virtual address space of the process is controlled. In one particular aspect, with 32-bit addressing, each process has its own page directory and, accordingly, when switching between processes, the CR3 register 106 which is storing the physical address of the aligned page directory is overwritten. The program does not in the least need to determine all the pages, tables, and directory elements; it is enough to determine only those which will be actually utilized and to dynamically add or remove new descriptions in the operating process.

Figure 3:
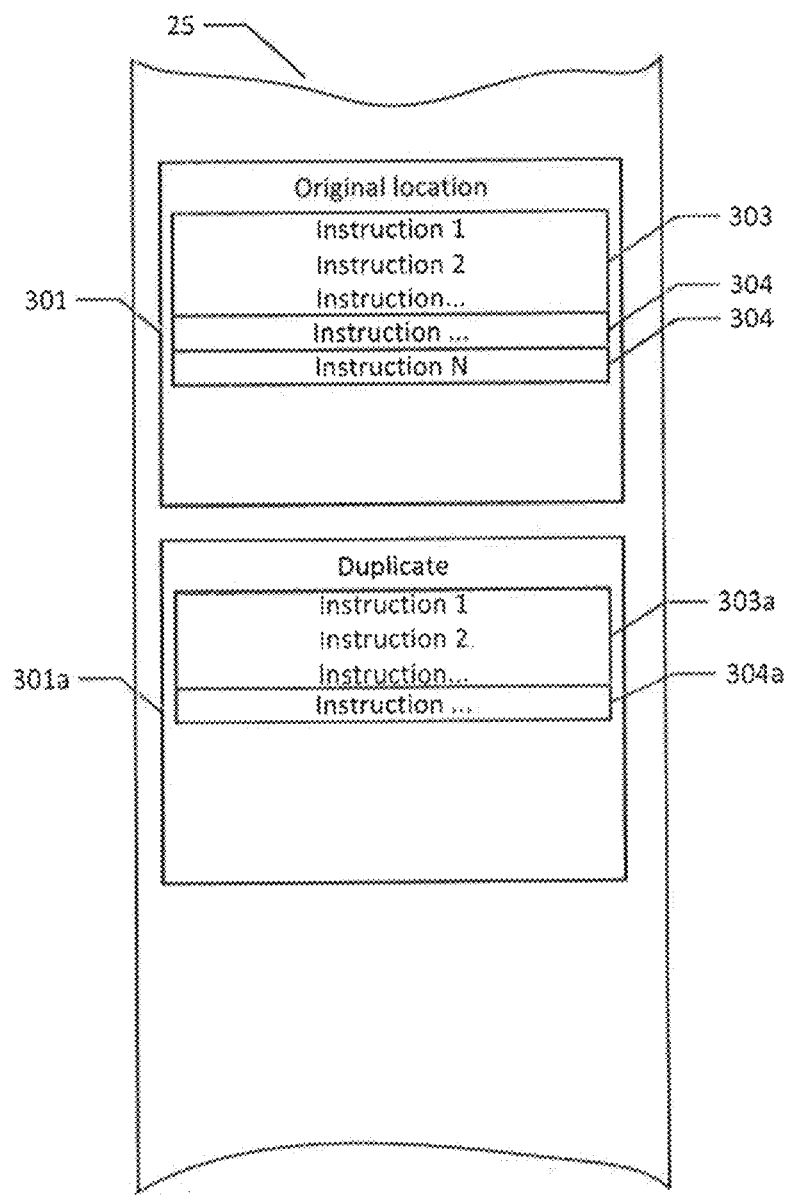
FIG. 3 shows a diagram of memory duplication according to one aspect.

FIG. 3 shows part of a system memory 22 in which instructions for execution have been written into a certain location 301. In one example, the memory location may be a location in the physical memory. In another example, the memory location may be a location in the system memory onto which logical pages are mapped, that is, a virtual memory location. In order to run a program under control in the original memory location 301, the sector of interest is determined. The sector of interest of a memory location may be any given sector of the memory location for which it is necessary to create a notification upon transferring the control of program instructions. In one example aspect, the sector of interest is a certain sector in a certain memory location which is isolated from the others on the basis of certain features determining the content of the sector, its arrangement and its purpose. For example, sectors of interest may be sectors of a memory location containing program instructions for which, when their control is transferred, it is necessary to check the status of the registers in order to evaluate the sequence of execution of the program instructions. A sector of interest can also bring together a set of instructions designed to perform a particular action (accessing the hard disk, transfer of information by a network, and so on).

Figure 4:
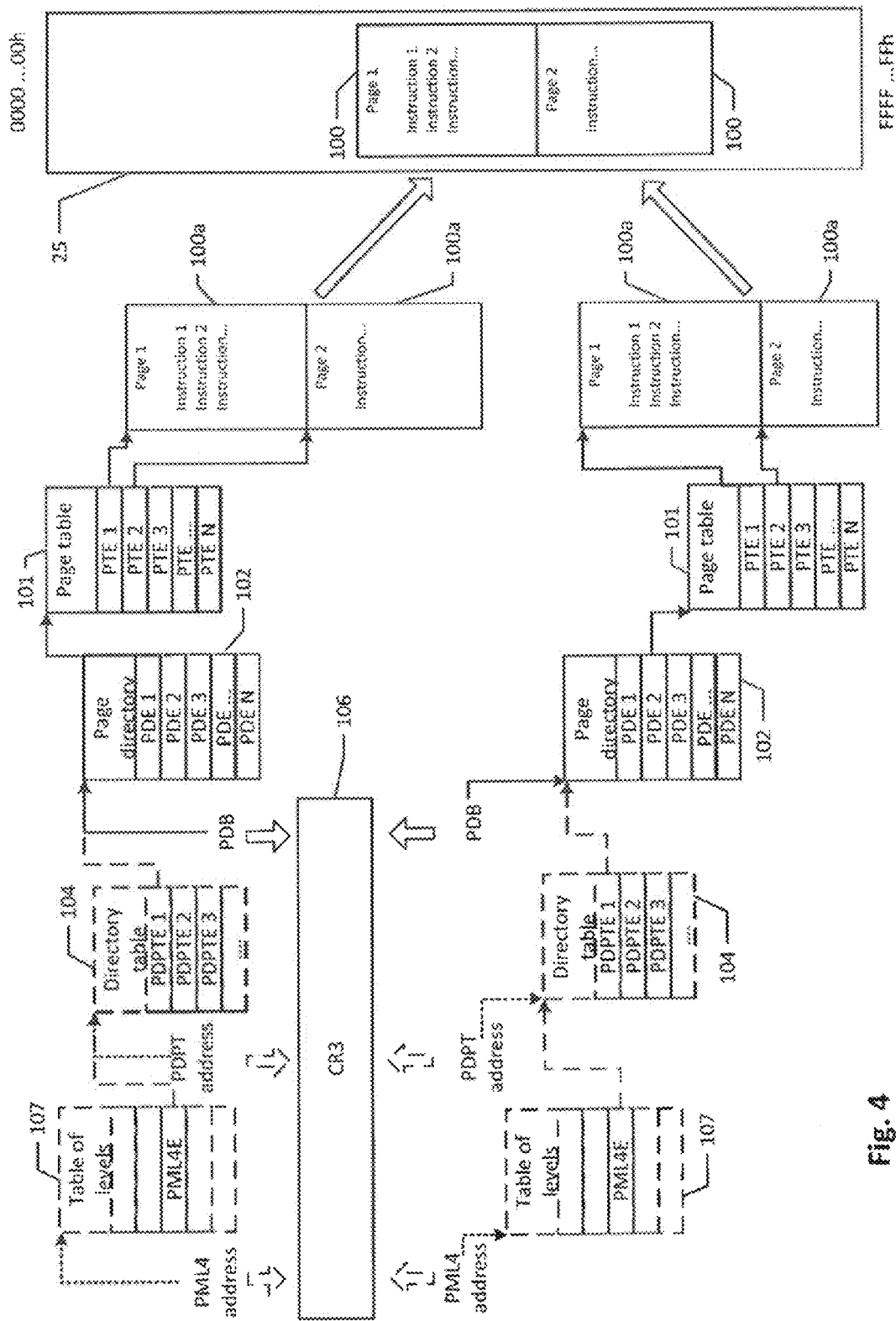
FIG. 4 shows a diagram of virtual memory duplication according to one aspect.

After this, sectors of the original memory location may be duplicated, where at least the sector of interest 303 is duplicated. Duplication of memory may done in various ways. In one example aspect, there is a direct copying of instructions and data of the sector into another memory location 301a (FIG. 3). Thus, sectors with identical content appear in the physical memory. In another example aspect, there is no copying of data, but new directories 102 and page tables 101 are created, pointing to those same locations of the physical memory (FIG. 4).

After this, memory sectors in the original memory location 301 may be tagged. In one example aspect, the tags for the sectors of interest 303 may be different from the tags of the other sectors 304 of the original location. In one example aspect, a modification of the instruction bytes of the memory sector may be used as a tag. In another example aspect, the instructions themselves and the data are in no way changed, but the attributes in the structures describing these sectors are changed. For example, the pages of a sector of interest are assigned the attribute of nonexecutable, while the pages of the other sectors are assigned the attribute of executable. It is also possible to use read/write and other attributes.

Next, the sectors in the duplicated memory location 301a may be tagged. In one example aspect, the tags for the sector of interest may be different from the tags of the other sectors of the duplicated memory location 301a. For example, the same tags may be used for the duplicated sector 303a as for the original one 303. In another example, different tags may be used. For example, in the original memory location the pages of the sector of interest 303 may be given the attribute of "nonexecutable", while the pages of the other sectors 304 of the original location may be given the attribute of "executable"; sectors which had the attribute of "nonexecutable" retain this attribute. For the duplicated region 301a, the attributes may be inverted: where the pages of the sector of interest may be given the attribute of "executable", while the pages of the other sectors may be given the attribute of "nonexecutable".

Next, a memory location is selected for the execution by the processor between the memory sector of interest and the duplicated memory sector. The processor than executes program instructions contained in the selected memory location.

In one example aspect, the instructions in the selected memory location are executed by the processor until a notification to transfer execution of the program to another memory sector is received. The notification may be created upon transfer of control of an instruction from a sector tagged with one tag to a sector of a location tagged by a different tag. Such notifications may be an interrupt or an exception. Interrupts and exceptions are events indicating that somewhere in the system (hardware) or within a current program or routine being executed there has arisen a condition requiring the immediate attention of the processor. Interrupts and exceptions generally result in a forced transfer of control from a current program or routine being executed to a special program procedure or routine, known as an interrupt handler or an exception handler. The action in response to the interrupt or exception is a processing of the interrupt or exception. Exceptions may arise when the processor determines the occurrence of an error in the process of executing an instruction.

In one example aspect, the receipt of a notification may result in a transfer of the execution of the program instructions to a memory location different from the one in which the notification was received. For example, if the program is executed in an original memory location 301, the execution will be transferred to the duplicated memory location 301a, and if program is executed in the duplicated memory location 301a, the execution will be transferred to the original memory location 301 or to another duplicated sector. The transfer of the execution may be done in various ways, depending on the way used to implement the duplication of the sectors of the original memory location. In one example aspect, the address of the next instruction of the execution is changed. In another example aspect, all the addresses remain unchanged, and only the value of the control register CR3 106 is changed, as shown in FIG. 4.

Figure 5:
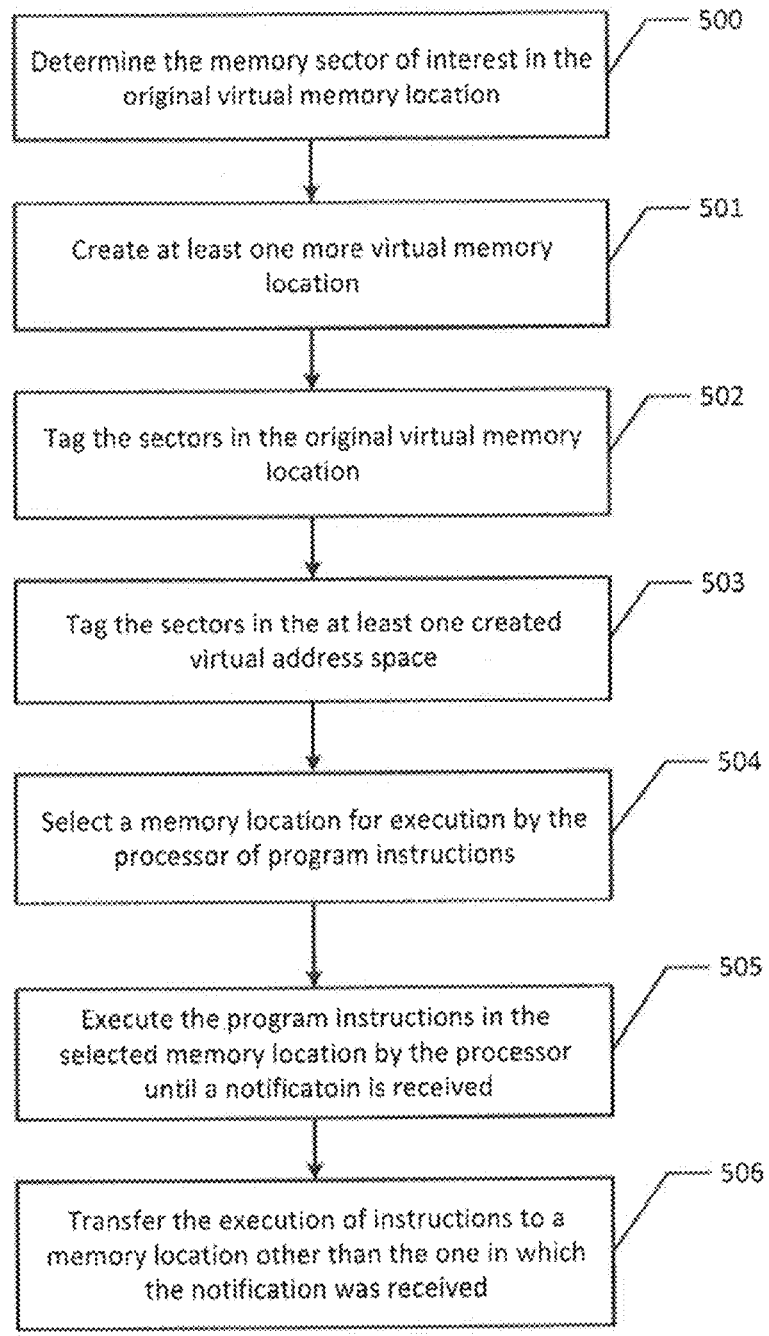
FIG. 5 shows an example method for transfer of control of the execution of program instructions from one virtual memory location to another according to one aspect.

FIG. 5 shows an example method of transfer of control of the execution of instructions from one virtual memory location to another. In step 500 a memory sector of interest consisting of at least one logical page is determined in the original virtual memory location. In step 501, at least one additional virtual memory location is created, which in one example, is mapped onto the same physical pages as the original virtual memory location. For this, a page directory and at least one page table are created. For the creation of the virtual memory location, in one particular instance the PTE and PDE of the original virtual location are copied.

Next, in step 502, the sectors in the original virtual memory location are tagged, the tags for the sector of interest being different from the tags of the other sectors of the original location; in one particular instance, the bit NX in the PTE structure is used for this: in one particular instance, the bit can be set for the pages of the sector of interest, and this bit is cleared for the pages of the other sectors; in another particular instance, the bit is cleared for the pages of the sector of interest and for the pages of the other sectors this bit is set. After setting the tags in the original location, in step 503, the sectors are tagged in at least one duplicated memory location, the tags for the sector of interest being different from the tags of the other sectors of the duplicated memory location. In one example aspect, the same mechanism of setting the NX bit is used in this step as was used for the original sector. In one example aspect, inversion may be employed, that is, if the NX bit was cleared for the pages of the sector of interest in the original memory location, this bit will be set in the duplicate of the original location for the pages of the sector of interest. In other example aspect, other bits of the PDE and PTE structures are used for the tags of the pages of the sectors, such as the R/W bit. In yet another example aspect, the bits are combined, for example, the NX bit is used for the original virtual location and the R/W bit for the duplicates of the virtual location.

In step 504, a memory location is selected for the execution of program instructions contained therein. Depending on the goals for which the switching between memory locations is used (e.g., logging, debugging, counteracting the exploitation of vulnerabilities, and so on), the original memory location or one of the duplicated memory locations may be selected.

In step 505, the instructions are executed in the selected memory location by the processor until a notification is received. The notification may be generated upon transfer of control of the instruction from a sector tagged by one tag to a sector of the location which is tagged by a different tag. In one example aspect, when using the NX bit as the tag, such a notification will be a page fault exception (#PF—Page-Fault Exception). This notification is created upon transfer of control from the Instructions of the sector of the memory location for the pages of which the NX bit was cleared, to an instruction of the sector of memory location for the pages of which the NX bit was set.

In the final step 506, the execution of instructions is transferred to a memory location different from the one in which the execution of instructions created the notification. In one example aspect, the transfer of control may be done by overwriting the contents of CR3, the type of contents overwritten being determined by an addressing mode (paging mode).

The above-described algorithm of transfer of the execution in one example aspect may be used in logging systems intended to form a log of calls of API functions which are called during the execution of a program. The process has a virtual address space (VAS) into which are loaded the necessary sections of the program files, as well as the dynamic DLL libraries associated with it. During the execution of the program code, calls of API functions occur from the different DLL libraries, which should also be entered in the call log of the API functions.

FIG. 6*a* shows an example of the memory of a process which is created by the OS. For clarity, the process memory distinguishes the sectors which contain the program instructions of modules and libraries, such as the "EXE" module, containing the program instructions of the file during the execution of which the process was created, and various dynamic libraries (e.g., Unknown.dll, other known.dll, kernel32.dll and Ntdll.dll). There are also sectors of "other memory" and "process heap", in which sectors any given auxiliary data can be stored.

It should be noted that, since there is a tremendous volume of libraries (FIG. 6*a* does not show the full diversity of libraries), all of the libraries are divided into only two groups for the logging system: libraries of interest and libraries of no interest. The libraries of Interest in the memory location constitute the memory sectors of interest 303 and 303*a*, the libraries of no interest together with the other modules comprise all other memory sectors 304 and 304*a*. Examples of the libraries of interest are the libraries "kernel32.dll" and "Ntdll.dll". Examples of the libraries of no interest are the libraries "Unknown.dll" and "Other known.dll". It is possible to form a list of dynamic libraries of interest, which will contain the libraries necessary for the logging. As a rule, the list of the libraries which are the most popular and often used by all of the processes can cover the work of all the others. Accordingly, all the other libraries will be libraries of no interest.

FIG. 6*b* and FIG. 6*c* show examples of VAS, one VAS being the original (FIG. 6*b*), the second a duplicate of the original VAS (FIG. 6*c*). In one example aspect, to form the list of API function calls, the logging system during the running of an executable file creates two new VASs in place of the original VAS. In another example aspect, two new VASs are created, but along with them the original VAS is used, which will be presented thereafter to the OS in the event of the latter accessing the VAS.

Thus, the memory of the process is divided into two parts. In the first original VAS 301, the sectors of interest 303 may be tagged as nonexecutable, by the method described above, and the calls of exportable functions of libraries the program instructions of which are contained in the pages of the sector of interest will be logged. The other sectors 304, such as the EXE module or the DLL libraries of no interest, may be tagged as executable. In the duplicate of the VAS 301*a*, the opposite may be done, the sectors of interest 303*a* may be tagged as executable and the other sectors 304*a* may be tagged as nonexecutable.

It should be noted that, regardless of the VAS, the content of the process memory always remains the same (that is, the Integrity of the address space is not disrupted). Only the attributes of the corresponding tables/pages are changed. This statement is true only for User Mode, in which a physical partitioning of the memory occurs. The partitioning consists in creating page directories and page tables for each copy of the VAS, and in one example aspect, directory tables and tables of page addressing levels with their own value of the control register CR3. The same physical page may be mapped in two directories, but with different attributes for the libraries the calls of which need to be logged. Thus, the switching between VASs may be done by overwriting (changing the contents) of the control register CR3.

In order for the logging system to be able to control the VAS (switch the operation between VASs), flags (NX bits) are arranged in the attributes section of each page for the corresponding pages in each VAS. The NX bit is a special flag used to determine the possibility of execution of program code located on the given memory page, or the occurrence of an exception (Page Fault, hereinafter #PF) in the event of attempting to execute the code. By "#PF" is meant an exception which arises upon attempting to run program code from a memory page for which such an execution is forbidden. By means of setting these NX bits, it becomes possible to switch the created VASs at the moment of the API function call. It should be noted that the calls will be logged upon switching from the original VAS 301 to the duplicate VAS 301*a*, and also upon switching in the reverse direction the value returned and several output parameters of the functions will be logged. This principle makes it possible to execute only the dynamic libraries of interest in the duplicate VAS 301*a*, and all the rest of the executable code in the original VAS 301.

Figure 7:
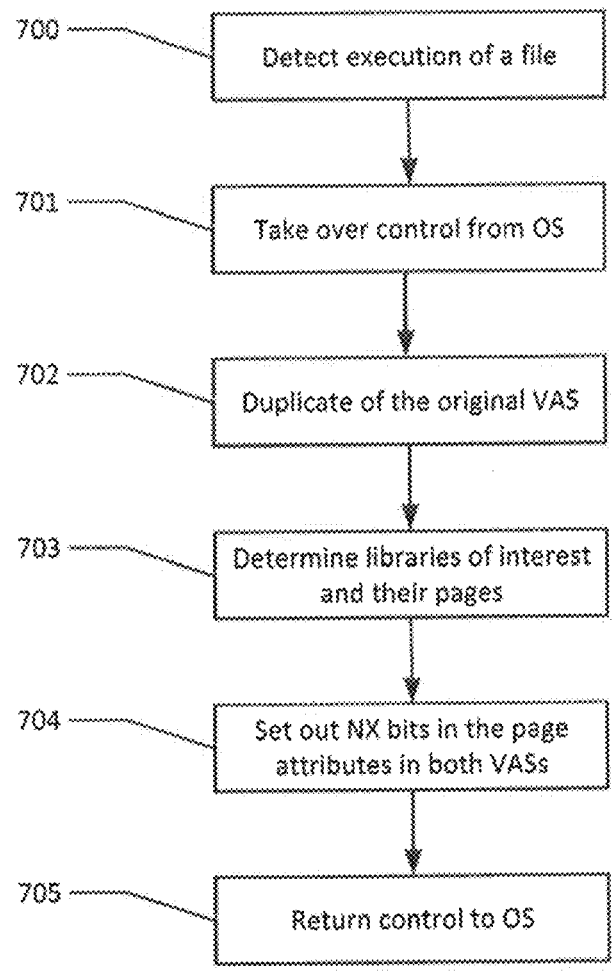
FIG. 7 shows an example method of virtual memory duplication for logging of program execution according to one aspect.

The logging of execution of program instructions using methods for virtual memory switching disclosed herein may be performed in the following manner. The logging system may contain a list of libraries of interest, and it also forms a kind of "library card" containing information on at least the addresses of the entry points to the libraries. FIG. 7 shows an example method of virtual memory duplication for logging of program execution according one aspect. At the start of the launching of the file being executed in step 700, the logging system takes over control in step 701 and forms two VASs, the original VAS 301 and a duplicate VAS 301*a*, in step 702. Next, in step 703, the libraries of interest and the pages thereof are determined. During the formation of the two VASs, the NX bits are set out in each of them in the attributes of the pages belonging to the libraries of interest and the pages belonging to all the rest of the code, step 704. Next, control is returned to the OS, step 705.

Figure 8:
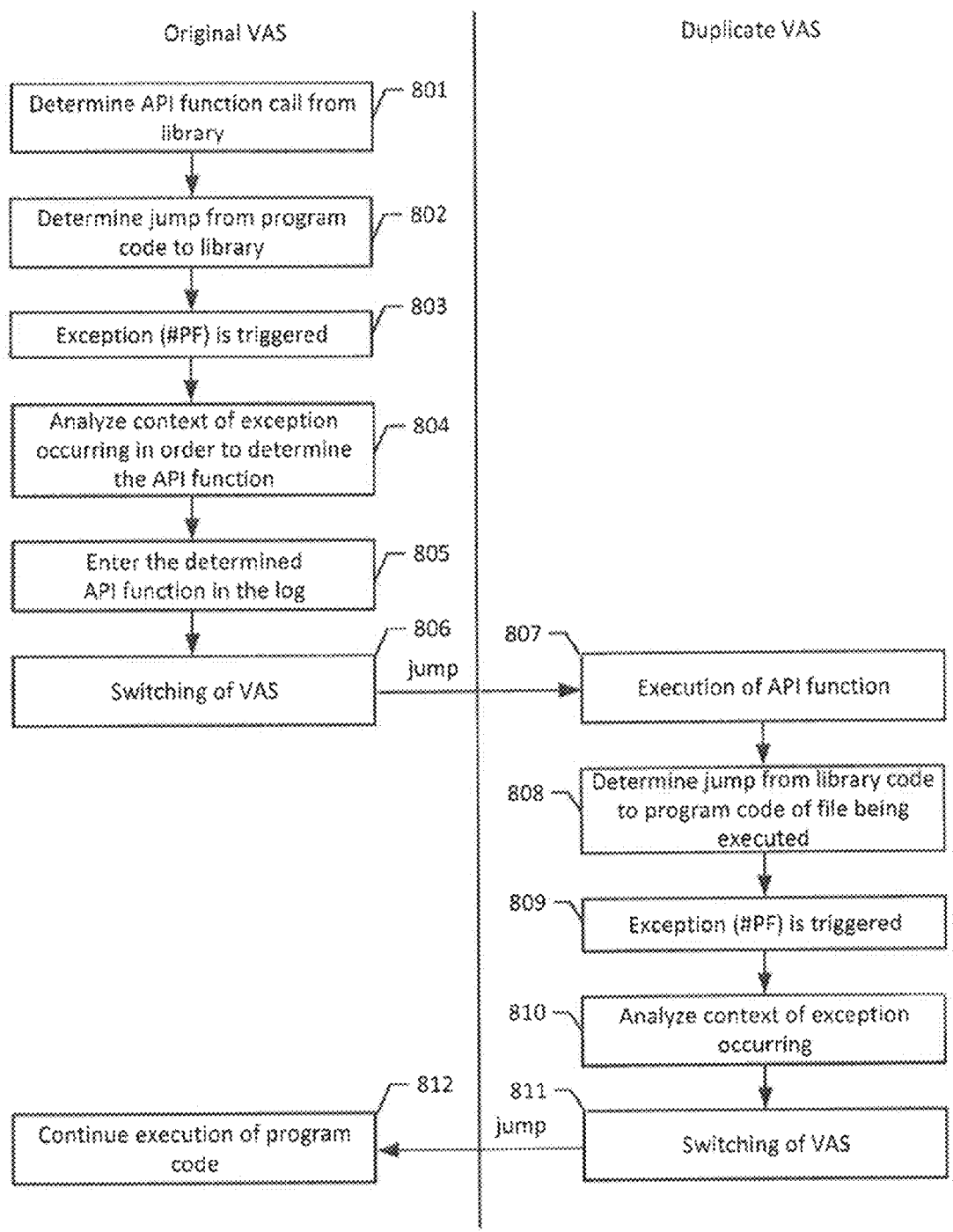
FIG. 8 shows an example method of logging of program execution according to one aspect.

FIG. 8 shows the method of operation of the logging system during the formation of the log of API function calls. At step 801, a certain API function from a library of interest is called during the running of the file being executed. For example, this is a calling of the "CreateFile" function, which is located in the dynamic library "kernel32.dll". Accordingly, at step 802, during the transfer (jump) of control at the indicated access address for the further execution of the function, the exception PageFault (#PF) occurs, at step 803, in accordance with the previously arranged NX bits. This situation is associated with the fact that the execution takes place in the original VAS 301, while as noted above the NX bits have been set in the attributes of the pages for the libraries of interest, indicating the impossibility of executing code in the given pages of the original VAS. Next, at step 804, with the help of the exception handler, an analysis is made of the context of the #PF exception in order to determine the cause of this exception and to determine the address of the API function which was called. Thus, the analysis consists in looking for the API function which corresponds to the memory address accessed by the call, from the table of API functions (which was previously created). After determining the API function, the information about it will be entered in the log of API function calls, at step 805, and a switching will be done from the original VAS 301 to the duplicate VAS 301*a*, at step 806, where the further execution of the code of the library of interest will occur, more precisely, the execution of the particular API function, at step 807.

Figure 6:
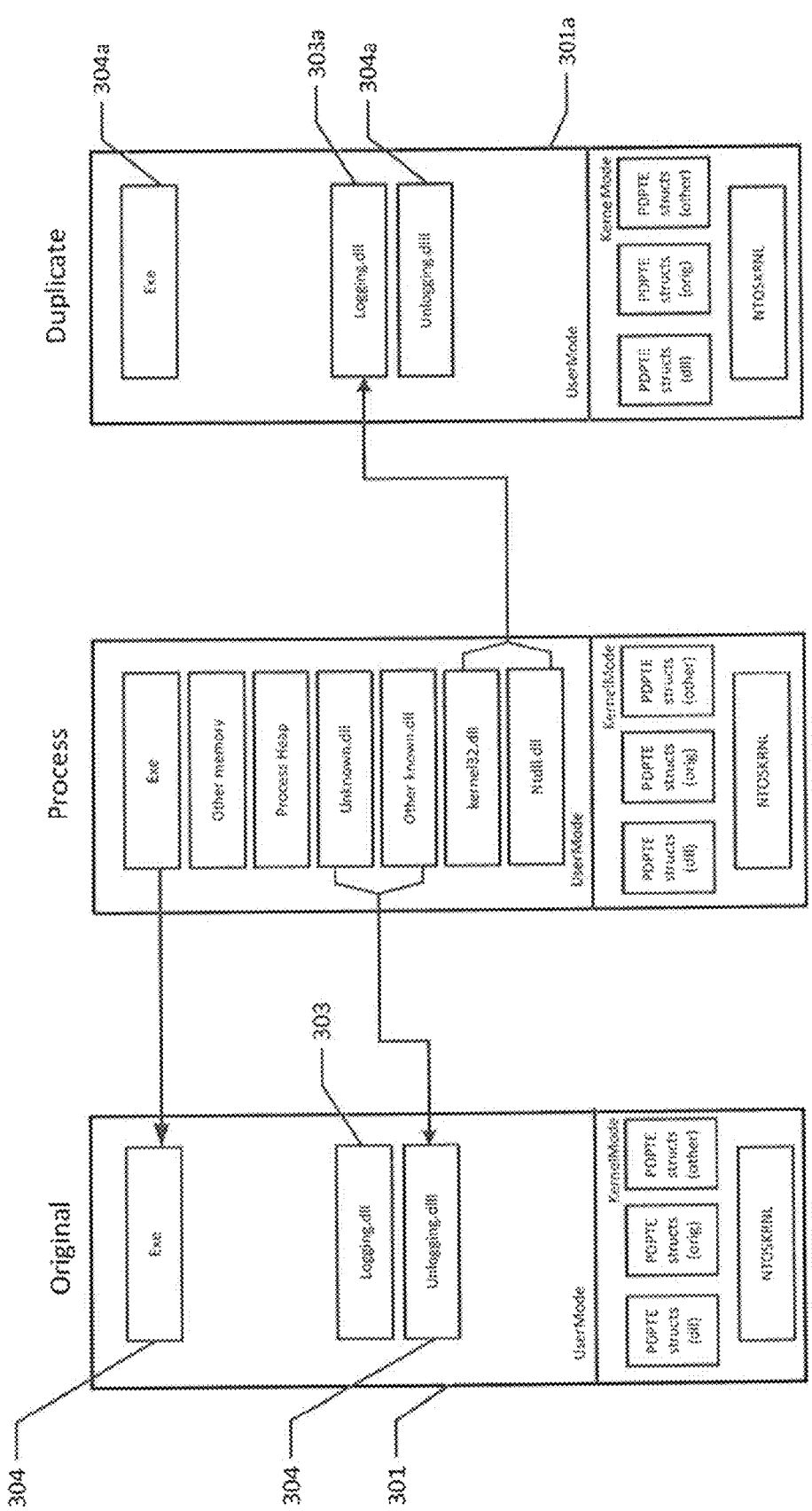
FIGS. 6A; 6B; and 6C show diagrams of example system for virtual memory duplication according to one aspect.

After the API function has performed its task, it is exited, that is, at step 808, a return jump to the program code of the file being executed (referring to FIG. 6, this is the transition from the "Logging.dlli" module to the "Exe" module). But due to the fact that this memory region in the duplicate VAS 301*a* is nonexecutable, the #PF exception arises, at step 809. This #PF is also analyzed, at step 810, to determine the cause of its occurrence. During the analysis, it is determined that there is a return from an API function, for example, with the help of information about the address of the jump. In this case, at step 811, there is a switching of the VAS from the duplicate 301*a* to the original 301, where the further execution of the program code continues at step 812. After the API function call appears again, all of the steps for switching the VAS are repeated until the program code is executed.

It should be noted that one of the features of the above-described technique is that the system does not change the memory content, but intervenes only in the mechanisms of the OS working with the memory.

In various aspects, the systems and methods described herein may be implemented in hardware, software, firmware, or any combination thereof. If Implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be Interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of Illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling execution of a computer program, the method comprising:
  determining a memory sector of interest in a first virtual memory location;
  duplicating the memory sector of interest in a second virtual memory location;
  tagging the memory sector of interest in the first virtual address space and the duplicated memory sector in the second virtual address space with different tags;
  selecting between the memory sector of interest and the duplicated memory sector a memory location for execution of the program;
  executing, by a hardware processor, the program in the selected memory location until receipt of a notification to transfer execution of the program from a memory sector tagged with one tag to a memory sector tagged with a different tag; and
  transferring program execution to the memory location other than the one in which the notification was received.

2. The method of claim 1, wherein duplicating the memory sector of interest in a second virtual memory location includes: mapping the second virtual memory location onto the same physical memory pages as the first virtual memory location.

3. The method of claim 1, wherein tagging at least the memory sector of interest in the first virtual address space includes: assigning an attribute of nonexecutable to one or more logical pages of the memory sector of interest in the first virtual address space.

4. The method of claim 1, wherein tagging the duplicated memory sector in the second virtual address space includes: assigning an attribute of executable to one or more logical pages of the duplicated memory sector in the second virtual address space.

5. The method of claim 1, wherein the notification includes one of an interrupt and exception.

6. The method of claim 1 further comprising:
saving in a log information about program instructions that transferred program control from a memory sector tagged with one tag to a memory sector tagged with a different tag.

7. The method of claim 1, wherein selecting a memory location further includes:
selecting the memory sector of interest for execution of program instructions; and
selecting the duplicate memory sector for execution of program API function libraries.

8. A system for controlling execution of a computer program, the system comprising:
a hardware processor coupled to a memory, the processor being configured to:
determine a memory sector of interest in a first virtual memory location;
duplicate the memory sector of interest in a second virtual memory location;
tag the memory sector of interest in the first virtual address space and the duplicated memory sector in the second virtual address space with different tags;
select between the memory sector of interest and the duplicated memory sector a memory location for execution of the program;
execute the program in the selected memory location until receipt of a notification to transfer execution of the program from a memory sector tagged with one tag to a memory sector tagged with a different tag; and
transfer program execution to the memory location other than the one in which the notification was received.

9. The system of claim 8, wherein duplicating the memory sector of interest in a second virtual memory location includes: mapping the second virtual memory location onto the same physical memory pages as the first virtual memory location.

10. The system of claim 8, wherein tagging at least the memory sector of interest in the first virtual address space includes: assigning an attribute of nonexecutable to one or more logical pages of the memory sector of interest in the first virtual address space.

11. The system of claim 8, wherein tagging the duplicated memory sector in the second virtual address space includes: assigning an attribute of executable to one or more logical pages of the duplicated memory sector in the second virtual address space.

12. The system of claim 8, wherein the notification includes one of an interrupt and exception.

13. The system of claim 8, wherein the processor further configured to:
save in a log information about program instructions that transferred program control from a memory sector tagged with one tag to a memory sector tagged with a different tag.

14. The system of claim 8, wherein selecting a memory location further includes:
selecting the memory sector of interest for execution of program instructions; and
selecting the duplicate memory sector for execution of program API function libraries.

15. A computer program product stored on a non-transitory computer-readable storage medium, the computer program product comprising computer-executable instructions for controlling execution of a computer program, including instructions for:
determining a memory sector of interest in a first virtual memory location;
duplicating the memory sector of interest in a second virtual memory location;
tagging the memory sector of interest in the first virtual address space and the duplicated memory sector in the second virtual address space with different tags;
selecting between the memory sector of interest and the duplicated memory sector a memory location for execution of the program;
executing, by a hardware processor, the program in the selected memory location until receipt of a notification to transfer execution of the program from a memory sector tagged with one tag to a memory sector tagged with a different tag; and
transferring program execution to the memory location other than the one in which the notification was received.

16. The computer program product of claim 15, wherein duplicating the memory sector of interest in a second virtual memory location includes: mapping the second virtual memory location onto the same physical memory pages as the first virtual memory location.

17. The computer program product of claim 15, wherein tagging at least the memory sector of interest in the first virtual address space includes: assigning an attribute of nonexecutable to one or more logical pages of the memory sector of interest in the first virtual address space.

18. The computer program product of claim 15, wherein tagging the duplicated memory sector in the second virtual address space includes: assigning an attribute of executable to one or more logical pages of the duplicated memory sector in the second virtual address space.

19. The computer program product of claim 15, wherein the notification includes one of an interrupt and exception.

20. The computer program product of claim 15 further includes instructions for:
saving in a log information about program instructions that transferred program control from a memory sector tagged with one tag to a memory sector tagged with a different tag.

21. The computer program product of claim 15, wherein selecting a memory location further includes:
selecting the memory sector of interest for execution of program instructions; and
selecting the duplicate memory sector for execution of program API function libraries.

* * * * *